United States Patent
Wanner (10) Patent No.: US 11,325,791 B2
(45) Date of Patent: May 10, 2022

(54) STORAGE APPARATUS FOR TRANSPORT GOODS AND STORAGE METHOD

(71) Applicant: SIEMENS AKTIENGESELLSCHAFT, Munich (DE)

(72) Inventor: Bertram Wanner, Meersburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/007,145

(22) Filed: Aug. 31, 2020

(65) Prior Publication Data

US 2021/0061579 A1    Mar. 4, 2021

(30) Foreign Application Priority Data

Aug. 30, 2019 (EP) .................................... 19194574

(51) Int. Cl.
| | |
|---|---|
| B65G 47/26 | (2006.01) |
| B65G 21/20 | (2006.01) |
| B65G 23/00 | (2006.01) |
| B65G 37/00 | (2006.01) |
| B65G 47/52 | (2006.01) |
| B65G 57/32 | (2006.01) |
| B07C 3/00 | (2006.01) |
| B07C 3/08 | (2006.01) |

(52) U.S. Cl.
CPC ....... *B65G 47/268* (2013.01); *B65G 21/2063* (2013.01); *B65G 23/00* (2013.01); *B65G 37/005* (2013.01); *B65G 47/52* (2013.01); *B65G 57/32* (2013.01); *B07C 3/008* (2013.01); *B07C 3/08* (2013.01); *B65G 2201/047* (2013.01); *B65G 2203/0233* (2013.01)

(58) Field of Classification Search
CPC ............ B65G 47/5154; B65G 47/5186; B65G 47/5168; B65G 47/5163; B65G 47/5159; B65G 47/515; B65G 47/268; B65G 47/261; B65G 47/082; B65G 57/32; B65G 37/02; B65G 37/005
See application file for complete search history.

(56) References Cited

U.S. PATENT DOCUMENTS

| | | | |
|---|---|---|---|
| 3,658,322 | A | 4/1972 | Martin |
| 6,098,782 | A | 8/2000 | Hardage et al. |
| 8,292,061 | B2 | 10/2012 | Iwasa et al. |

(Continued)

FOREIGN PATENT DOCUMENTS

| | | |
|---|---|---|
| DE | 1260290 B | 2/1968 |
| DE | 19917655 A1 | 10/2000 |

(Continued)

*Primary Examiner* — William R Harp
(74) *Attorney, Agent, or Firm* — Laurence A. Greenberg; Werner H. Stemer; Ralph E. Locher (57) ABSTRACT

A storage apparatus for transport goods includes a first conveyor, a second conveyor and a deflecting mechanism for deflecting transport goods conveyed by the first conveyor onto the second conveyor. A motor configuration is provided for motorized driving of the first conveyor and/or the second conveyor. A step is provided over which the transport goods are conveyed. The storage apparatus is configured to vertically compress the transport goods with the aid of the step. A method for storing transport goods, in particular packages, is also provided.

14 Claims, 3 Drawing Sheets

(56) References Cited

U.S. PATENT DOCUMENTS

| 10,781,053 B1* | 9/2020 | Zhao | B65G 21/02 |
| 2013/0134015 A1 | 5/2013 | Arimatsu | |
| 2014/0041991 A1* | 2/2014 | Winkler | B65G 47/22 |
| | | | 198/462.3 |

FOREIGN PATENT DOCUMENTS

| EP | 2204343 A1 | 7/2010 |
| FR | 2095656 A5 | 2/1972 |
| JP | H05305927 A | 11/1993 |
| WO | 2007090636 A1 | 8/2007 |

* cited by examiner

STORAGE APPARATUS FOR TRANSPORT GOODS AND STORAGE METHOD

CROSS-REFERENCE TO RELATED APPLICATION

This application claims the priority, under 35 U.S.C. § 119, of European Patent Application EP 19194574, filed Aug. 30, 2019; the prior application is herewith incorporated by reference in its entirety.

BACKGROUND OF THE INVENTION

Field of the Invention

The present invention relates to a storage apparatus for transport goods, in particular packages, and to a method for storing transport goods, in particular packages.

Processing systems for the largely automated processing of transport goods, for example packages, are known. With the aid of sorting plants, individual transport goods can be discharged from a flow of transport goods for further processing according to predefined criteria, for example destination, volume, weight, fragility and/or the like, in such a processing system. Following discharge, the transport goods frequently have to be stored up until further processing, for example until loading.

Therefore, an HGV (Heavy Goods Vehicle), for example, has a particular loading volume. For reasons of efficiency, loading of the HGV with transport goods conventionally only starts when enough transport goods are available for continuous loading.

In order to store the transport goods, storage apparatuses are known which have so-called storage chutes in which the transport goods are primarily conveyed by way of gravity and have a lower end which can be closed. When the storage chute is closed, the transport goods can be stored accordingly in a storage apparatus of that kind without disrupting the flow of transport goods in the processing system. In the process the transport goods for storage slide so far down the storage chute that they meet transport goods that have already been stored.

BRIEF SUMMARY OF THE INVENTION

It is accordingly an object of the invention to provide a storage apparatus for transport goods and a storage method, which overcome the hereinafore-mentioned disadvantages of the heretofore-known apparatuses and methods of this general type and which improve the storage of transport goods, in particular to reduce the stress on stored transport goods and/or make them more compact.

With the foregoing and other objects in view there is provided, in accordance with a first aspect of the invention, a storage apparatus for transport goods, in particular packages, including a first conveyor, a second conveyor and a deflecting mechanism for deflecting transport goods conveyed by the first conveyor to the second conveyor. Inventively, a motor configuration is provided for motorized driving of the first conveyor and/or second conveyor, and a step, over which the transport goods are conveyed. The storage apparatus is adapted to vertically compress the transport goods with the aid of the step.

A step (landing, offset or shoulder) within the meaning of the invention is formed, in particular, by the configuration of two components of the storage apparatus at different heights. In particular, a step can be formed between two components, for example two conveyors, by placing the two components at a distance from each other in the vertical direction. The two components preferably adjoin each other in the horizontal direction.

A motor configuration within the meaning of the invention is, in particular, a configuration including a plurality of motors, in particular electric motors. Individual motors can be coupled to different conveyors and/or deflecting mechanisms. For example, a first electric motor can be coupled to the first conveyor and a second electric motor to the second conveyor.

A vertical compression within the meaning of the invention is in particular stacking or heaping-up of transport goods in a vertical direction, in other words, in the effective direction of gravitation. With vertical compression the transport goods are preferably at least partially lying on top of each other.

One aspect of the invention is based on the approach of providing a motor configuration, for example one or more electric motor(s), in a storage apparatus in order to drive a first conveyor and/or a second conveyor for conveying transport goods in a motorized manner. It is thereby possible to configure a conveying path through the storage apparatus particularly flexibly, in particular so as to run upwardly at least in certain sections and/or at least horizontally. This can save installation space underneath the first and second conveyors, so the storage apparatus can be driven under, for example, more easily with an HGV for loading. In particular, a loading bridge or loading ramp can thereby be provided underneath the conveyor. Furthermore, supplying transport goods to the storage apparatus or issuing transport goods from the storage apparatus can be precisely controlled by active conveying of the transport goods. Therefore, stresses acting on the transport goods can be significantly reduced compared to conventional storage apparatuses.

In addition, it is provided that the storage apparatus has a step, over which the transport goods are conveyed when being stored. The storage apparatus is preferably adapted, for example by appropriate operation of the first and/or second conveyor, to compress the transport goods in the vertical direction with the aid of the step, in other words, to partially stack or at least heap up at least some of the transport goods. The step can be constructed, for example, in such a way that incoming transport goods on the first conveyor or transport goods deflected by a deflecting mechanism drop onto the second transport device. Further transport goods conveyed over the step can therefore form a stack or heap until the first or second conveyor conveys the formed stack onward and therefore creates space for a new stack. The (onward) conveying with the aid of the first or second conveyor preferably occurs gradually, so that continuous compression and therewith particularly space-efficient storage can be achieved.

The step preferably has a height of 3 to 500 mm. In this range there is, for example with regard to the packages for storing, a good compromise between the dimensions that occur and the stresses that occur upon conveying over the step. Greater step heights can be selected to achieve a greater storage capacity due to higher stacks or heaps of transport goods.

The first conveyor and the second conveyor preferably each define a straight conveying section. The conveying sections can be, for example, in each case about 5 to 25 m, preferably about 10 to 20 m, in particular about 14 m.

The deflecting mechanism is preferably adapted to deflect the transport goods in a direction at least substantially perpendicular to the conveying section formed by the first and/or second conveyor. The deflecting mechanism can also form a straight conveying section, which preferably runs perpendicularly to the conveying sections defined by the conveyors, but at least perpendicularly to the conveying section defined by the second conveyor.

The first and second conveyors each include at least one active conveying device, in other words, one which can be driven with the aid of the motor configuration, for example a conveyor belt. The deflecting mechanism can also include an active conveying device, for example a conveyor belt. Providing an active conveying device makes conveying of the transport goods particularly reliable and controllable.

Alternatively, it is also conceivable, however, to construct the deflecting mechanism to be passive, for example as a roller conveyor or a chute. This can simplify the construction of the storage apparatus.

Hereinafter preferred embodiments of the invention and their developments will be described, which, in each case, provided this is not expressly ruled out, can be randomly combined with each other and with the aspects of the invention described below.

In a preferred embodiment, the second conveyor is disposed relative to the deflecting mechanism in such a way that the step is formed between the deflecting mechanism and the second conveyor. In particular, the second conveyor can be disposed in such a way that transport goods deflected by the deflecting mechanism drop onto the second conveyor, for example from a height of between 3 and 500 mm. This configuration corresponds to a particularly efficient construction of the storage apparatus since the conveying path of the transport goods within the storage apparatus is interrupted for the purpose of deflection anyway. If the step is provided downstream of the deflecting mechanism in the conveying direction, then an additional interruption in the conveying path is not necessary.

As an alternative or in addition, it is also conceivable that even the first conveyor is vertically offset with respect to a plane in which transport goods enter. In this construction the step is therefore disposed upstream of the first conveyor in the conveying direction, so that a vertical compression can be achieved as early as on the first conveyor. The provision of a plurality of steps, for example upstream of the first conveyor in the conveying direction and between the deflecting mechanism and the second conveyor, is particularly advantageous. A vertical compression can therefore be achieved at a plurality of locations within the storage apparatus in order to further increase the reliability of the vertical compression.

In a further preferred embodiment, the motor configuration is adapted for motorized driving of the deflecting mechanism. For example, the motor configuration can include a deflection motor, in particular an electric one, which is coupled to the deflecting mechanism. Deflection can occur particularly reliably as a result of the motorized drive. In particular, the risk of transport goods becoming wedged or stuck in the region of the deflecting mechanism can be at least reduced.

In a further preferred embodiment, the second conveyor extends at least substantially parallel to the first conveyor. A parallel extension is in this case, in particular, the parallel orientation of a main extension of the second conveyor relative to a main extension of the first conveyor. In other words, transport goods can be conveyed by the second conveyor in a conveying direction, which matches or is opposed to the conveying direction of transport goods conveyed by the first conveyor. The second conveyor is preferably disposed to adjoin the first conveyor. The conveying path, which is composed of the conveying sections defined by the first and second conveyors, can therefore form a U-shape. Even with limited installation space, a high storage volume of the storage apparatus, for example at least 5 $m^3$, preferably at least 8 $m^3$, in particular at least 10 $m^3$, can be achieved thereby.

Alternatively, it is also conceivable, however, that the second conveyor extends substantially at a right angle to the first conveyor. This can be advantageous, for example, if due to installation space limitations, a loading ramp cannot be disposed underneath the first conveyor.

In a further preferred embodiment, the second conveyor is limited at a first end by a rear wall. The storage apparatus can be operated in a compression operating mode in this case, in which the second conveyor drives the transport goods against the rear wall, for example by appropriate control of the motor configuration. In particular, in the compression operating mode, when first and second conveyors extend in a parallel direction, the transport goods are conveyed by the second conveyor, preferably in a conveying direction, which is opposed to the conveying direction of transport goods conveyed by the first conveyor. Horizontal compression of the transport goods can be achieved hereby, in other words, the density of stored transport goods along the conveying section defined by the second conveyor can be increased in this way.

In a further preferred embodiment, the storage apparatus can be operated in a discharge operating mode. In this mode the second conveyor drives the transport goods preferably to a second end of the second conveyor, at which the transport goods can be issued from the storage apparatus. The storage apparatus can be adapted, for example, firstly in the compression operating mode, to horizontally compress the transport goods on the second conveyor for efficient storage and, if the storage apparatus is full, to discharge the transport goods disposed on the two conveyors in the discharge operating mode. The storage volume of the storage apparatus can therefore be particularly well utilized.

In a further preferred embodiment, the storage apparatus has a sensor device for detecting transport goods, in particular those entering the storage apparatus, and a control device. The sensor device can have for example an optical sensor such as a camera or a light barrier. The control device is preferably adapted to control the motor configuration on the basis of the detection of transport goods. The control device can be adapted, for example, to induce gradual conveying of the transport goods by the first and/or second conveyor. In particular, the control device can be adapted to induce conveying of the transport goods on the first conveyor if, for example, the sensor device constructed as a light barrier, is interrupted, for example due to transport goods backing-up, for longer than a predefined maximum duration. Such backing-up of transport goods can form, for example, if, downstream of a step, upstream of the first or second conveyor, a stack or heap has formed having a height which substantially matches the height of the step, in other words, which prevents further transport goods from dropping onto the first or second conveyor. Reliable and substantially continuous vertical compression of the transport goods in the storage apparatus can thereby be achieved.

In a further preferred embodiment, the control device can be adapted to receive information, provided from outside of the storage apparatus, with respect to incoming transport goods and to control the motor configuration on the basis of the received information. This control can take place as an alternative or in addition to control on the basis of transport goods detected with the aid of the sensor device. For example, the control device can be adapted to induce conveying of the transport goods on the first and/or second conveyor as a function of the dimensions or volume of incoming transport goods. It is for instance conceivable that the control device induces conveying of transport goods lying on the first conveyor in order to create space on the first conveyor for particularly large incoming transport goods. This can prevent transport goods already located on the conveyor from being damaged by (large) incoming transport goods, in particular if these transport goods drop over the step onto the conveyor.

In a further preferred embodiment, the first conveyor includes at least one conveying device, for example a conveyor belt. In particular, the first conveyor can include exactly one conveying device. This allows particularly reliable conveying of the transport goods by the first conveyor. In addition, this can facilitate driving of the first conveyor by the motor configuration, in particular a first electric motor.

In a further preferred embodiment, the second conveyor includes at least two conveying devices, for example two conveyor belts, which can be driven independently of each other, preferably also independently of the at least one conveying device of the first conveyor, with the aid of the motor configuration. In particular, the second conveyor can include exactly two conveying devices. For example, the storage apparatus, in particular the control device, can be adapted to induce conveying of transport goods by just one of the at least two conveying devices of the second conveyor. It is thereby possible to convey only some of the transport goods located on the second conveyor for issue from the storage apparatus to the second end of the second conveyor, for instance to load an HGV with a low loading volume. In addition, the provision of at least two conveying devices allows the second conveyor to gradually discharge stored transport goods from the storage apparatus (so-called batch emptying). This can facilitate logistics.

In the compression operating mode, the control device is preferably adapted to drive the conveying devices of the first and second conveyors synchronously with the aid of the motor configuration. In the discharge operating mode at least the control device can also drive the various conveying devices independently of each other, however, in particular successively, with the aid of the motor configuration.

In a further preferred embodiment, the storage apparatus has a further deflecting mechanism for deflecting transport goods conveyed by the second conveyor. The further deflecting mechanism is preferably adapted to deflect the transport goods in a conveying direction perpendicular to the conveying direction, in which transport goods are conveyed by the second conveyor. For this purpose, the further deflecting mechanism can, in particular, have a conveying device, for example a conveyor belt. Preferably, the further deflecting mechanism is adapted to deflect transport goods conveyed by the second conveyor to an issuing device for issuing the transport goods from the storage apparatus. Alternatively, the further deflecting mechanism can also be adapted, however, to deflect transport goods conveyed by the second conveyor to a further conveyor. Components of the storage apparatus, in particular an issuing device or further conveyors, can be compactly disposed in this way.

In a further preferred embodiment, the storage apparatus has an issuing device, which is adapted to issue transport goods conveyed by the first and second conveyors, in particular transport goods deflected by the further deflecting mechanism, from the storage apparatus. The issuing device can be adapted to discharge the transport goods into a transport device, for example an HGV. For this purpose, the issuing device can be set up as a telescopic conveyor with variable conveying length.

In a further preferred embodiment, the storage apparatus has two side walls, which are disposed on opposing longitudinal sides of the first conveyor, in particular for guiding the transport goods, wherein one of the two side walls ends at a predefined spacing from the deflecting mechanism. In other words, one of the side walls extends over the entire length of the first conveyor, while the second of the side walls is shortened in comparison thereto. This shortened side wall can extend, for example, only over 70 to 90%, in particular about 80%, of the total length of the first conveyor. In particular, the predefined spacing can be 1 to 4 m, preferably 1.5 to 3 m, in particular with a length of the first conveyor of about 14 m. This can facilitate deflection of the transport goods onto the second conveyor. In particular, the risk of the transport goods becoming wedged upon deflection, in particular transport goods of above average size, can therefore be reduced.

The side walls preferably run along the conveying section defined by the first conveyor. The shortened side wall, which ends at the predefined spacing from the deflecting mechanism, can also limit the second conveyor at one of its longitudinal sides. This permits a particularly compact construction of the storage apparatus.

In a further preferred embodiment, the storage apparatus has at least one further conveyor that can be driven with the aid of the motor configuration and a further deflecting mechanism for deflecting transport goods that are conveyed by the second conveyor to the at least one further conveyor. The at least one further conveyor preferably extends parallel to the second conveyor. The at least one further transport device can therefore convey transport goods in a conveying direction, which is opposed to the conveying direction of transport goods conveyed by the second transport device. Preferably, a further step is provided between the one further deflecting mechanism and the at least one further conveyor, in particular for further vertical compression of the transport goods. The provision of at least one further conveyor allows an even more compact construction of the storage apparatus in a direction perpendicular to the conveying sections defined by the conveyors disposed in parallel.

Advantageously, the conveyors can be disposed in such a way that they define a substantially spiral-shaped or helical conveying path. The conveying path is composed in this case of the conveying sections that in each case correspond with the conveyors. With a spiral-shaped conveying path, the at least one further conveyor is preferably disposed in a particularly compact manner underneath the first conveyor. The vertical spacing between the first and the at least one further conveyor, in other words, the pitch of the spirals or helix, can be defined, for example, by the height of the step between the deflecting mechanism and the second conveyor and optionally also by a further step between the further deflecting mechanism and the at least one further conveyor. As an alternative or in addition, the first and/or the second conveyor can also be disposed to be tilted with respect to the horizontal, in other words, to define a sloping conveying section, to achieve an adequate pitch.

Alternatively, the conveyors can also be disposed in such a way that they define a meandering conveying path. This is particularly advantageous if the step between two conveyors or the steps between more than two conveyors is/are not sufficiently high to place the at least one further conveyor underneath the first conveyor and simultaneously ensure reliable conveying of even large-volume transport goods.

With the objects of the invention in view, there is concomitantly provided, in accordance with a second aspect of the invention, a method for storing transport goods, in particular packages, preferably with the aid of a storage apparatus, having the following steps: (i) motorized driving of a first conveyor and a second conveyor with the aid of a motor configuration; (ii) deflecting transport goods conveyed by the first conveyor to the second conveyor with the aid of a deflecting mechanism; and (iii) conveying the transport goods over a step for vertical compression, preferably with the aid of the deflecting mechanism. The method steps do not necessarily have to be carried out in the given sequence. In particular, it is conceivable to convey the transport goods initially with the aid of the first conveyor, then to deflect them with the aid of the deflecting mechanism onto the second conveyor and in the process, at least in one specific embodiment, convey them over the step and then convey them onwards with the aid of the second conveyor.

The description of preferred embodiments of the invention given until now includes numerous features, several of which are in part combined when reproduced in the individual dependent claims. These features can also be considered individually, however, and be combined to form expedient further combinations. In particular, these features can in each case be combined individually and in any desired suitable combination with the storage apparatus as claimed in the first aspect of the invention and the method as claimed in the second aspect of the invention.

The properties, features and advantages of the invention described above and the manner in which they are achieved will become clearer and more comprehensible in connection with the following description of exemplary embodiments of the invention, which are explained in more detail in connection with the figures in which the same reference numerals are consistently used for the same or mutually corresponding elements of the invention. The exemplary embodiments serve to explain the invention and do not limit the invention to the combinations of features disclosed therein nor in relation to functional features. In addition, features of the exemplary embodiments suitable for this purpose can also be considered explicitly in isolation and be combined with any of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
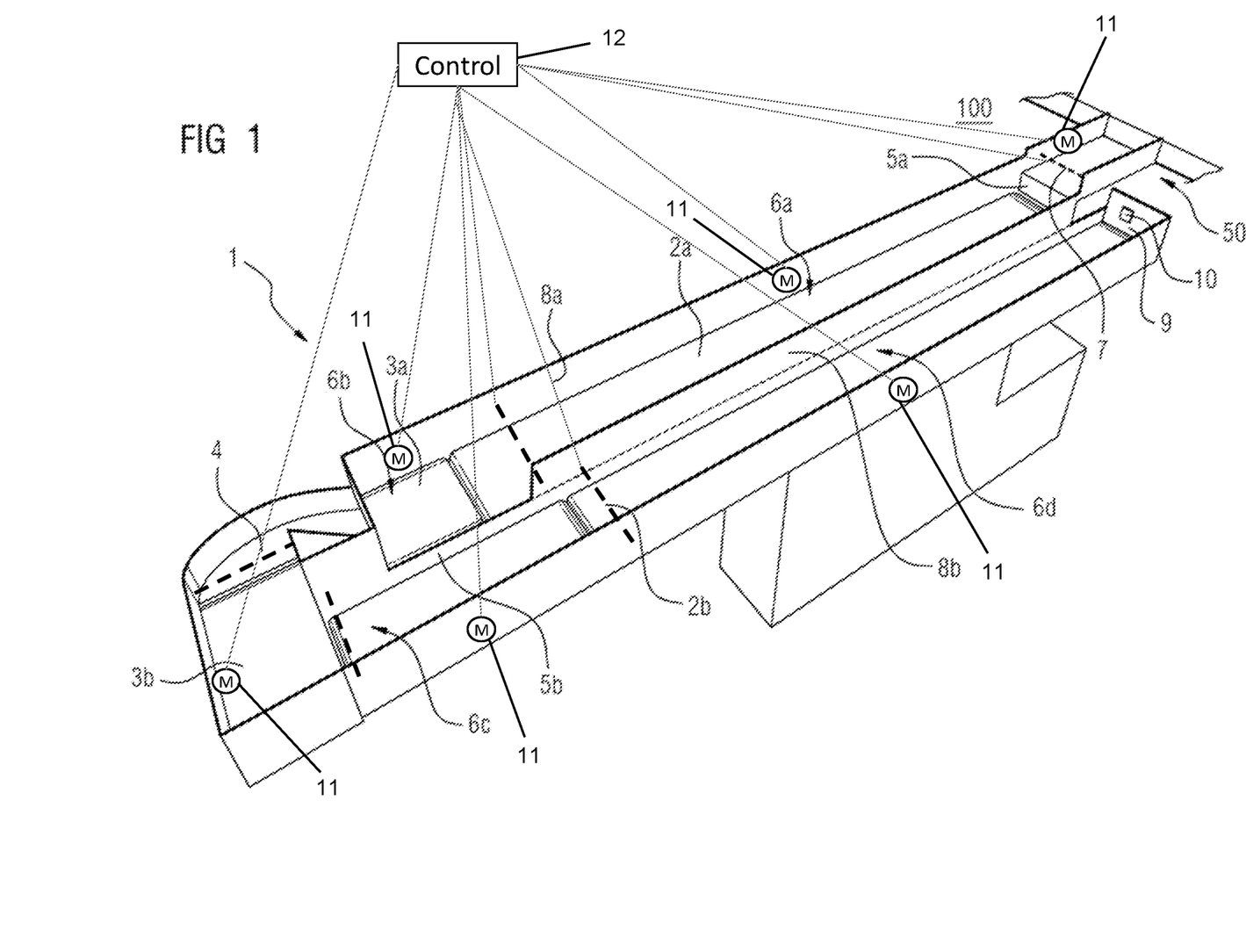
FIG. 1 is a diagrammatic, perspective view of an example of a storage apparatus with two conveyors.

Referring now to the figures of the drawings in detail and first, particularly, to FIG. 1 thereof, there is seen one example of a storage apparatus 1 for transport goods, in particular packages, with two conveyors 2a, 2b. The conveyors 2a, 2b are coupled to a motor configuration M11, which is adapted for motorized driving of the conveyors 2a, 2b. Transport goods conveyed by the first conveyor 2a can be deflected with the aid of a deflecting mechanism 3a onto the second conveyor 2b, so that transport goods that are to be stored are distributed between the two conveyors 2a, 2b. The conveying direction of the second conveyor 2b is reversible. Transport goods conveyed by the second conveyor 2b can therefore be deflected through a further deflecting mechanism 3b to an issuing device 4. With the aid of the issuing device 4, which can be constructed, for example, as a telescopic conveyor with a variable conveying length, or as a chute, it is possible to load a transport device located under the conveyors 2a, 2b, for example an HGV, with the transport goods stored in the storage apparatus 1.

The storage apparatus 1 is preferably part of a processing system 100 for transport goods, in particular packages, and can be used, for example, for storing transport goods discharged by the processing system 100 from a flow of transport goods. The transport goods are preferably discharged with the aid of a sorting mechanism 50, which is coupled to the storage apparatus 1. Transport goods that are discharged from the flow of transport goods can therefore enter the storage apparatus 1.

In the illustrated exemplary embodiment, the storage apparatus 1 has two steps 5a, 5b (landings, offsets or shoulders) through which the transport goods can be conveyed for vertical compression of the transport goods that are to be stored. The first step 5a is disposed at a first end of the first conveyor 2a facing the sorting mechanism 50, so that transport goods entering the storage apparatus 1 drop through the first step 5a onto the first conveyor 2a, for example from a height of between 3 and 500 mm. For this purpose, the first conveyor 2a can, for example, be vertically offset with respect to a plane in which the transport goods discharged from the flow of transport goods enter the storage apparatus 1.

In order to achieve the vertical compression, in other words for example stacks or heaps of transport goods, a conveying device 6a of the first conveyor 2a, for example a conveyor belt, is preferably only gradually moved, to convey the transport goods in the direction of the second end of the first conveyor 2a remote from the sorting mechanism 50. For this purpose, a control device 12 for example can be provided which controls the motor configuration M11 accordingly. In particular, the control device 12 can be adapted to induce the motor configuration to drive the first conveyor 2a with a motor and therewith to convey the transport goods located on the first conveyor 2a if a sensor device 7 constructed as a light barrier and disposed upstream of the first step 5a in the conveying direction is interrupted or triggered for a predefined maximum duration. An interruption of this kind can be generated, for example, by transport goods backing-up, for instance if the transport goods have stacked up downstream of the first step 5a in the conveying direction, in other words, on the first conveyor 2a, to the height of the step 5a and therefore further transport goods cannot drop down from the first step 5a. If the conveying device 6a continues to move in this case, space is created again downstream of the first step 5a in the conveying direction, so that the transport goods that are backing-up can drop through the step 5a onto the first conveyor 2a. Preferably, the control device 12 is adapted to control the motor configuration M11 in such a way that the conveying device 6a continues to move only by a predefined distance, for example by an average transport goods length. A new stack or heap of transport goods can thereby form. In this way an at least substantially homogeneous vertical compression can be achieved along the conveying section defined by the first conveyor 2a.

As an alternative or in addition, it is also possible that in the case of control of the motor configuration, the control device 12 is adapted to take into account information with respect to the incoming transport goods, which can be provided, for example, by the sorting mechanism 50. Such information, for instance with respect to the dimensions and/or volume of the incoming transport goods, can be used to create sufficient space on the first conveyor 2a downstream of the first step 5a for particularly large transport goods, in particular those of above average size. For this purpose, the control device 12 is preferably adapted to move the conveying device 6a onward as a precaution by way of appropriate control of the motor configuration M11 if the information provided by the sorting mechanism 50 indicates entry of large transport goods. The conveying device 6a can be moved onward in particular by the size of the incoming transport goods, in particular by a distance derived from its dimensions. Not only can this prevent backing-up, but it also makes it possible to prevent unnecessary crushing of transport goods already located on the first conveyor 2a by subsequent, particularly large transport goods.

The at least partially stacked transport goods are therefore gradually conveyed by the first conveyor 2a to the deflecting mechanism 3a preferably disposed at the second end of the first conveyor 2a. The deflecting mechanism 3a preferably also includes a conveying device 6b, in particular also a conveyor belt, although it is disposed in such a way that the transport goods are deflected onto the second conveyor 2b substantially perpendicularly to the conveying section defined by the first conveyor 2a. This allows the second conveyor 2b to be disposed so as to adjoin the first conveyor 2a, in particular parallel to the first conveyor 2a, and therefore particularly compactly. The provision of the second conveyor 2b means that the storage volume of the storage apparatus 1 provided by the first conveyor 2a can be substantially doubled without the length of the first conveyor 2a having to be increased. As a result of this compact configuration, the storage apparatus 1 can also be installed, for example, in narrow halls or rooms.

For the purpose of reliable conveying of transport goods by the first conveyor 2a, two side walls 8a, 8b are preferably provided on opposing longitudinal sides of the first conveyor 2a. The side wall 8a disposed on the longitudinal side remote from the second conveyor 2b preferably extends along the entire conveying section defined by the first conveyor 2a, in other words, in particular from the first step 5a to the deflecting mechanism 3a. In contrast, the side wall 8b disposed on the longitudinal side facing the second conveyor 2b is shorter in construction and ends, in particular, at a predefined spacing from the deflecting mechanism 3a. The shorter side wall 8b can extend, for example, over 70 to 90% of the conveying section defined by the first conveyor 2a. This allows a clearance in the region of the deflecting mechanism 3a and therefore enables reliable deflecting of even large transport goods.

Upon deflection of the transport goods onto the second conveyor 2b, the transport goods are preferably conveyed over the second step 5b between the deflecting mechanism 3a and the second conveyor 2b vertically offset relative thereto, so the transport goods can drop from the deflecting mechanism 3a onto the second conveyor 2b. A further vertical compression of the transport goods on the second conveyor 2b or at least a reliable maintenance of the vertical compression achieved with the aid of the first step 5a is enabled thereby.

Transport goods deflected onto the second conveyor 2b are firstly driven in a compression operating mode of the storage apparatus 1 by the second conveyor 2b in the direction of a rear wall 9 disposed at a first end of the second conveyor 2b. The first end of the second conveyor 2b preferably faces the sorting mechanism 50, in other words, the first end of the second conveyor 2b is located next to the first end of the first conveyor 2a, so a compact U-shaped conveying path, which is composed of the conveying sections defined by the first and second conveyors 2a, 2b, results. By driving the transport goods against the rear wall 9, a horizontal compression of the transport goods, in other words a compression along the conveying section defined by the second conveyor 2b, can be achieved.

If the storage apparatus 1 is at least substantially filled, in other words the first and second conveyors 2a, 2b are substantially completely occupied by transport goods, the transport goods, in a discharge operating mode of the storage apparatus 1, can be conveyed by the second conveyor 2b to the further deflecting mechanism 3b disposed at a second end of the second conveyor 2b. Preferably, this occurs gradually by way of independent driving of two conveying devices 6c, 6d of the second conveyor 2b with the aid of the motor configuration. The two conveying devices 6c, 6d can be constructed, for example, as two conveyor belts disposed one behind the other along the conveying section defined by the second conveyor 2b.

For example, the control device 12 can be adapted, in the discharge operating mode, to firstly induce conveying of the transport goods, which are located on the conveying device 6c disposed at the second end of the second conveyor 2b, in the direction of the further deflecting mechanism 3b. If all transport goods located in the region of the second step 5b have been discharged in this way, the control device 12 can induce driving of the conveying device 6d disposed at the first end of the second conveyor 2b in order to also discharge the remaining transport goods located on the second conveyor 2b. Preferably, the control device 12 is adapted to then induce driving of the conveying device 6a of the first conveyor 2a until the storage apparatus 1 is completely empty.

The provision of two conveying devices 6c, 6d of the second conveyor 2b can therefore facilitate gradual discharging of transport goods stored in the storage apparatus 1 (so-called batch emptying). In addition, it is in particular also possible to only discharge transport goods received by the storage apparatus 1 at a later instant. The two conveying devices 6c, 6d can therefore increase the flexibility and in particular allow a reorganization of the flow of transport goods.

The two-stage emptying of the second conveyor 2b with the aid of the two conveying devices 6c, 6d, in the present exemplary embodiment, enables in particular a reduction in the risk of transport goods on the second conveyor 2b becoming wedged with transport goods which project beyond the second step 5b of the deflecting mechanism 3a into the conveying section defined by the second conveyor 2b.

In order to be able to determine substantially complete filling of the storage apparatus 1, the storage apparatus 1 preferably has a further sensor device 10 in the region of the first end of the second conveyor 2b, in particular in the region of the rear wall 9. The further sensor device 10 can have, for example, an optical sensor, for example a camera or light barrier, and be adapted to detect the impact of the first transport goods on the rear wall 9. As an alternative or in addition, the further sensor device 10 can have a pressure sensor and be adapted to detect the back pressure generated by the transport goods being driven against the rear wall 9, which pressure becomes ever greater with increasing horizontal compression along the conveying section defined by the second conveyor 2b. The control device is preferably correspondingly adapted to transfer the storage apparatus 1 from the compression operating mode into the discharge operating mode upon detection of the first transport goods or upon detection of a back pressure, which is above a predefined back pressure threshold value, in order to initiate discharging of the stored transport goods. As an alternative or in addition, the control device 12 can also be adapted to generate a fill signal upon detection of the first transport goods or upon detection of a back pressure, which lies above the predefined back pressure threshold value, in response to which the sorting mechanism 50 does not discharge any further transport goods from the flow of transport goods in the direction of the storage apparatus 1.

Figure 2:
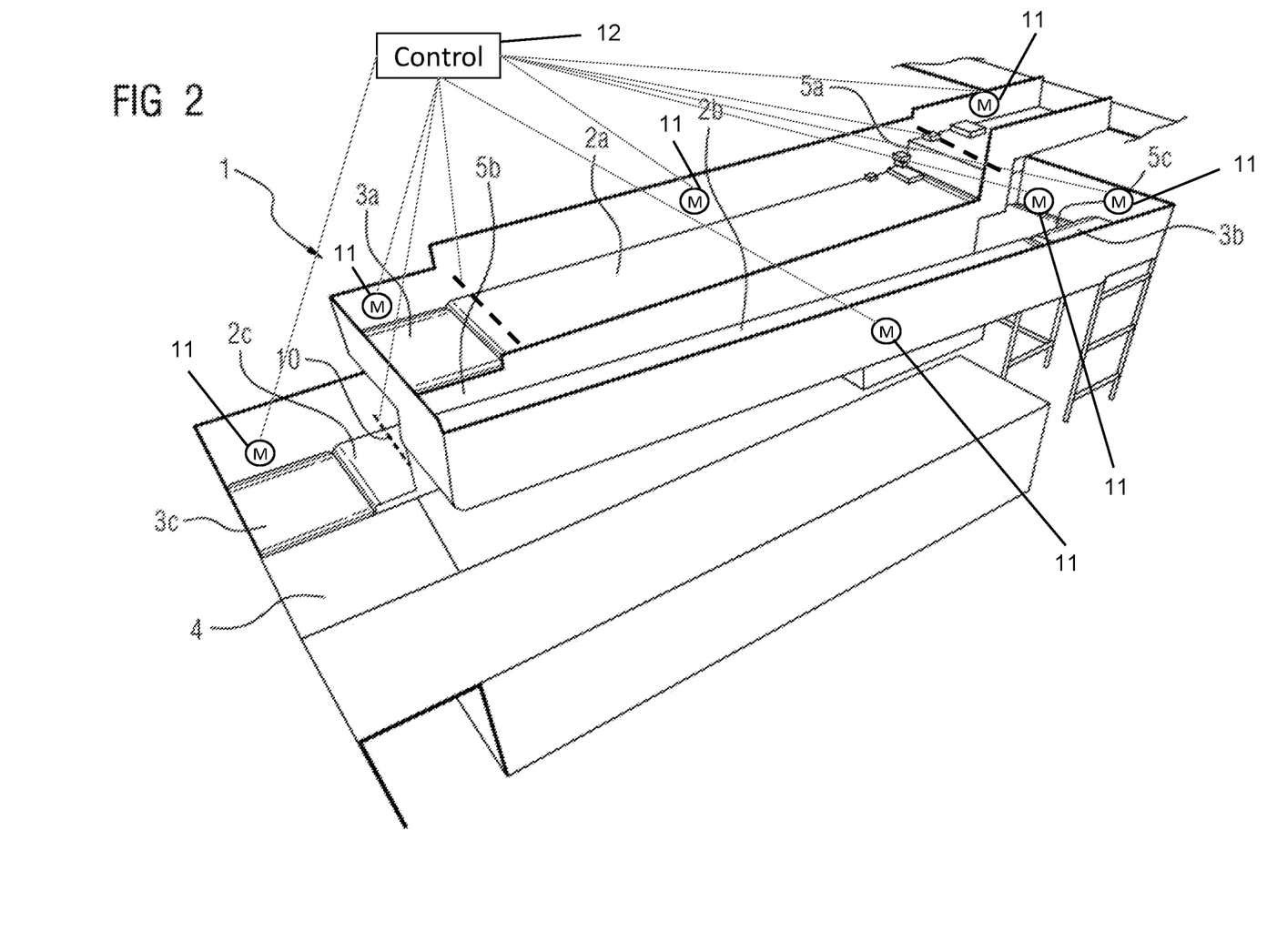
FIG. 2 is a perspective view of an example of a storage apparatus with three conveyors.

FIG. 2 shows an example of a storage apparatus 1 for transport goods, in particular packages, with three conveyors 2a, 2b, 2c. Apart from the third conveyor 2c, which is disposed substantially underneath the first conveyor 2a, the storage apparatus 1 differs from the storage apparatus shown in FIG. 1 in that the further deflecting mechanism 3b, instead of being disposed at the second end of the second conveyor 2b, is disposed at the first end of the second conveyor 2b and, more precisely, is provided instead of a rear wall, in order to deflect the transport goods conveyed by the second conveyor 2b onto the third conveyor 2c. There is preferably a third step 5c between the further deflecting mechanism 3b and the third conveyor 2c to be able to achieve a further vertical compression of the transport goods. In particular, the transport goods deflected by the further deflecting mechanism 3b can thus drop at a first end of the third conveyor 2c onto the third conveyor 2c. Disposed at an opposing second end of the third conveyor 2c is, moreover, a further deflecting mechanism 3c to divert transport goods conveyed by the third conveyor 2c to an issuing device 4, which is constructed in the present example as a drop point.

In this exemplary embodiment the conveying path, which is produced from the conveying sections defined by the respective first, second and third conveyors 2a, 2b, 2c, is spiral-shaped or helical and therefore very compact. In order to create sufficient space for the configuration of the third conveyor 2c or for transport goods conveyed by the third conveyor 2c, preferably at least the second conveyor 2b has a sloping construction, in other words, is disposed at an angle to the horizontal. Together with the vertical offset formed by the steps 5b, 5c a sufficient displacement of the third conveyor 2c underneath the first conveyor 2a can therefore be achieved.

In order to determine complete filling of the storage apparatus 1 in this case, the further sensor device 10, preferably constructed as an optical sensor, can be disposed in the region of the second end of the third conveyor 2c. The control device can then be adapted, upon detection of first transport goods at this position, to generate a corresponding fill signal.

Figure 3:
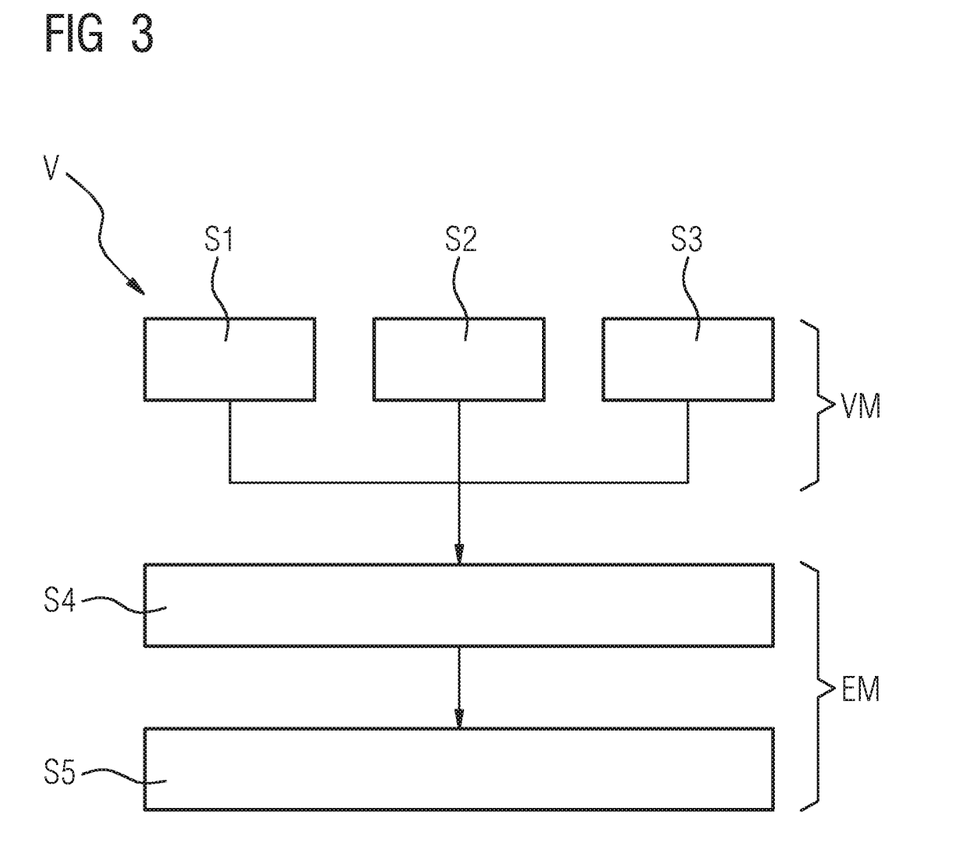
FIG. 3 is a block diagram of an example of a method for storing transport goods.

FIG. 3 shows an example of a method V for storing transport goods, in particular packages, preferably with the aid of a storage apparatus shown in FIG. 1 or FIG. 2.

In a method step S1, transport goods are conveyed by a first conveyor from a first end of the first conveyor to a deflecting mechanism disposed at an opposing second end of the first conveyor. For this purpose, a motor configuration M11 coupled to the first conveyor, in particular a first electric motor of the motor configuration, can be correspondingly controlled for instance by a control device 12.

In a further method step S2, the transport goods conveyed by the first conveyor are deflected with the aid of the deflecting mechanism onto a second conveyor. For this purpose, the deflecting mechanism can be adapted to change the direction of movement of the transport goods with respect to the longitudinal extension of the first conveyor by substantially 90°. For example, the control device 12 can control the motor configuration M11, likewise coupled to the deflecting mechanism, in particular a deflection motor of the motor configuration, correspondingly to move a transport device such as a conveyor belt of the deflecting mechanism.

In the course of method step S2, transport goods are also conveyed over a step, which is formed between the deflecting mechanism and the second conveyor. The transport goods consequently drop from the deflecting mechanism onto the second conveyor. A heap of transport goods can accordingly form there.

In a further method step S3, the transport goods deflected onto the second conveyor are conveyed by the second conveyor. For this purpose, the motor configuration M11, in particular a second electric motor of the motor configuration, can be controlled accordingly. Preferably, the control device 12 induces gradual conveying of the transport goods by the second conveyor, so that when the second conveyor stops, further heaps or stacks of transport goods that drop from the step can form in each case.

Method steps S1 to S3 are preferably performed until the storage apparatus is completely full.

With reference to the storage apparatus shown in FIG. 1, the performance of method steps S1 to S3 can correspond to a compression operating mode VM. After filling of the storage apparatus, the storage apparatus shown in FIG. 1 can be put into a discharge operating mode EM, in which, firstly, the transport goods conveyed on the second conveyor are conveyed in a further method step S4 by the second conveyor to an issuing device and then the transport goods located on the first conveyor are conveyed in a further method step S5 by the interplay of first conveyor and the deflecting mechanism to the second conveyor and in this way likewise conveyed to the issuing device.

When method steps S1 to S3 are performed, method steps S1 and S3 are preferably performed synchronously, in other words, conveying devices, for example in the form of conveyor belts, of the first and second conveyors synchronously convey gradually. By contrast, method step S2 can be performed continuously, in other words, the conveying device of the deflecting mechanism conveys continuously. Consequently, when the two conveyors stop, due to the constant deflecting and conveying over the step, the stack of transport goods can be generated on the second conveyor.

The invention claimed is:

1. A storage apparatus for transport goods or packages, the storage apparatus comprising:
   a first conveyor and a second conveyor;
   a deflector for deflecting transport goods conveyed by said first conveyor to said second conveyor;
   a motor configuration for motorized driving of at least one of said first conveyor or said second conveyor;
   a step configured to permit the transport goods to be conveyed over said step, said step configured to aid in vertically compressing the transport goods by the storage apparatus; and a rear wall delimiting a first end of said second conveyor, said second conveyor driving the transport goods against said rear wall in a compression operating mode of the storage apparatus.

2. The storage apparatus according to claim 1, wherein said step is disposed between said deflector and said second conveyor.

3. The storage apparatus according to claim 1, wherein said motor configuration is configured for motorized driving of said deflector.

4. The storage apparatus according to claim 1, wherein said second conveyor extends at least substantially parallel to said first conveyor.

5. The storage apparatus according to claim 1, wherein said second conveyor drives the transport goods to a second end of said second conveyor, and said second end of said second conveyor is configured to permit the transport goods to be issued from the storage apparatus in a discharge operating mode of the storage apparatus.

6. The storage apparatus according to claim 1, which further comprises a sensor device for detecting transport goods, and a control device configured to control said motor configuration based on a detection of the transport goods by said sensor device.

7. The storage apparatus according to claim 1, which further comprises a control device configured to receive information, provided from outside of the storage apparatus, with respect to incoming transport goods, said control device configured to control said motor configuration based on the received information.

8. The storage apparatus according to claim 1, wherein said first conveyor includes at least one conveyor belt.

9. The storage apparatus according to claim 1, wherein said second conveyor includes at least two conveying devices configured to be driven independently of each other by said motor configuration.

10. The storage apparatus according to claim 1, which further comprises a further deflector for deflecting transport goods conveyed by said second conveyor.

11. The storage apparatus according to claim 1, which further comprises an issuer configured to issue transport goods conveyed by said first and second conveyors out of the storage apparatus.

12. The storage apparatus according to claim 1, which further comprises two side walls each disposed on a respective one of two opposing longitudinal sides of said first conveyor, one of said two side walls ending at a predefined spacing from said deflector.

13. The storage apparatus according to claim 1, which further comprises at least one further conveyor configured to be driven by said motor configuration, and a further deflector for deflecting transport goods conveyed by said second conveyor onto said at least one further conveyor.

14. A method for storing transport goods or packages, the method comprising:
using a motor configuration for motorized driving of a first conveyor and a second conveyor;
using a deflector for deflecting transport goods conveyed by the first conveyor onto the second conveyor;
conveying the transport goods over a step for vertical compression;
using a rear wall to delimit a first end of the second conveyor; and
using the second conveyor to drive the transport goods against the rear wall in a compression operating mode of the storage apparatus.

* * * * *